(12) United States Patent
Ito et al.

(10) Patent No.: US 8,063,980 B2
(45) Date of Patent: Nov. 22, 2011

(54) ACCESSORY AND ACCESSORY FOR IMAGE PICKUP APPARATUS

(75) Inventors: Masahiko Ito, Tokyo (JP); Naofumi Yoneda, Tokyo (JP)

(73) Assignee: Sony Corporation, Tokyo (JP)

(*) Notice: Subject to any disclaimer, the term of this patent is extended or adjusted under 35 U.S.C. 154(b) by 31 days.

(21) Appl. No.: 12/161,147

(22) PCT Filed: Oct. 2, 2007

(86) PCT No.: PCT/JP2007/069253
§ 371 (c)(1),
(2), (4) Date: Aug. 8, 2008

(87) PCT Pub. No.: WO2008/078439
PCT Pub. Date: Jul. 3, 2008

(65) Prior Publication Data
US 2010/0149408 A1    Jun. 17, 2010

(30) Foreign Application Priority Data
Dec. 26, 2006   (JP) ................. 2006-349028

(51) Int. Cl.
*H04N 5/225*   (2006.01)

(52) U.S. Cl. ............ 348/373; 348/222.1; 348/372; 348/374; 348/376

(58) Field of Classification Search .......... 348/222.1, 348/372–276, 311; 323/351; 396/296, 341–346, 396/529, 530
See application file for complete search history.

(56) References Cited

U.S. PATENT DOCUMENTS
6,333,825 B1 * 12/2001 Hamasaki et al. ............ 359/699
7,616,880 B2 * 11/2009 Shirako et al. ................ 396/144

FOREIGN PATENT DOCUMENTS

| JP | 64-006624 | 1/1989 |
|---|---|---|
| JP | SHO 64-006624 | 1/1989 |
| JP | 6-060810 | 8/1994 |
| JP | HEI 06-060810 | 8/1994 |
| JP | 10-062856 | 3/1998 |
| JP | 11-194395 | 7/1999 |
| JP | HEI 11-194395 | 7/1999 |
| JP | 2004-294904 | 10/2004 |
| JP | 2005-157130 | 6/2005 |

OTHER PUBLICATIONS

Preliminary Report on Patentability and Written Opinion dated Jul. 9, 2009, for corresponding Patent Application PCT/JP2007/069253.
Japanese Office Action issued on Oct. 28, 2010, for corresponding Application No. JP 2006-349028.

* cited by examiner

*Primary Examiner* — Yogesh Aggarwal
(74) *Attorney, Agent, or Firm* — K&L Gates LLP (57) ABSTRACT

An accessory and an accessory for an image pickup apparatus are provided and are advantageous in reducing cost by reducing the number of parts. A retaining ring is engaged in an annular groove formed in an outer circumference of a cylindrical part of a wide-angle converter lens. Each of retaining ridges has a bottom wall extending from the inner circumference of the annular part in the direction of the width of the annular part in a recess, and a protruded wall extending radially outward of the annular part from the end of the bottom wall, spaced from the annular part, and protruding radially outward from the first outer circumference. When the parts, provided with the retaining ridges, of the annular part are depressed radially inward of the annular part, the protruded wall sink radially inward from the first outer circumference.

13 Claims, 9 Drawing Sheets

ACCESSORY AND ACCESSORY FOR IMAGE PICKUP APPARATUS

CROSS REFERENCE TO RELATED APPLICATIONS

The present application claims priority to Japanese Patent Application No. 2006-349028 filed on Dec. 26, 2006, the entire contents of which is being incorporated herein by reference.

BACKGROUND

The present disclosure relates to an accessory capable of being attached to and detached from an image pickup apparatus or the like by a single action, and an accessory for an image pickup apparatus.

A conversion lens is an example of accessories used with an image pickup apparatus, such as a digital camera or a video camera.

A conversion lens of this type is provided with a clamping member for engaging/disengaging the conversion lens with/from an image pickup apparatus (See JP H10-62856 A).

Conventional accessories including such a conversion lens need a plurality of members in combination to arrange the clamping member. Necessity of the plurality of members is disadvantageous from the view point of cost reduction by reducing the number of components.

SUMMARY

An object of the present disclosure is to provide an accessory and an accessory for an image pickup apparatus advantageous for cost reduction by reducing the number of components.

In an embodiment, an accessory is provided that includes a cylindrical member to be connected to a device, and a retaining ring mounted on the outer circumference of the cylindrical member. The retaining ring has an elastically deformable annular part mounted on the outer circumference, and retaining ridges disposed on the annular part so as to protrude radially outward from the outer circumference. The retaining ridges move radially inward of the annular part together with parts of the annular part when the parts, where the retaining ridges are disposed, of the annular part are depressed radially inward of the annular part.

In an embodiment, an accessory, for an image pickup apparatus includes an annular housing holding an optical part therein, an outer circumference, to be joined to the image pickup apparatus, formed in the housing, an annular groove formed in the outer circumference, and a retaining ring fitted in the annular groove. The retaining ring has an elastically deformable annular part fitted in the annular groove, and retaining ridges disposed in the annular part so as to protrude radially outward from the outer circumference. The retaining ridges move together with parts of the annular part radially inward from the outer circumference when the parts, where the retaining ridges are formed, of the annular part are depressed radially inward of the annular part.

In an embodiment, the retaining ridges are formed integrally with the retaining ring, and the retaining ridges can be moved in radial directions simply by pinching the retaining ring.

Thus, the accessory can be attached to and detached from a device by using a single retaining ring, which is advantageous for reducing the number of components and reducing cost.

Additional features and advantages are described herein, and will be apparent from, the following Detailed Description and the figures.

BRIEF DESCRIPTION OF THE DRAWINGS

FIG. 6(A) is a perspective view of a retaining ring 36 and the FIG. 6(B) is a perspective view of the retaining ring 36 with the operating projections 56 depressed.

BRIEF DESCRIPTION OF THE FIGURES

Embodiments will be described below with reference to figures.

Figure 1:
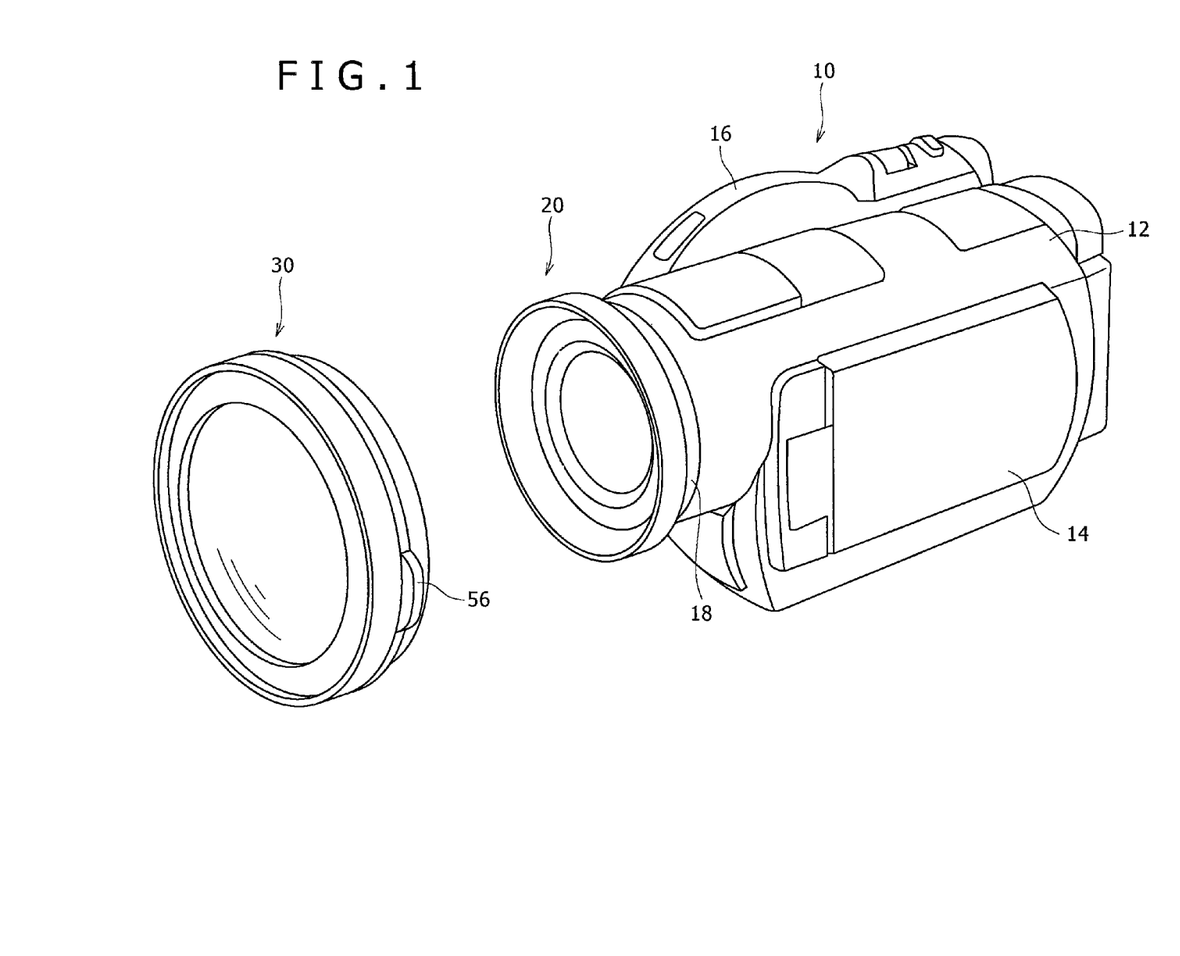
FIG. 1 is a perspective view of a video camera 10, an adapter ring 20 and a wide-angle converter lens 30.
Figure 2:
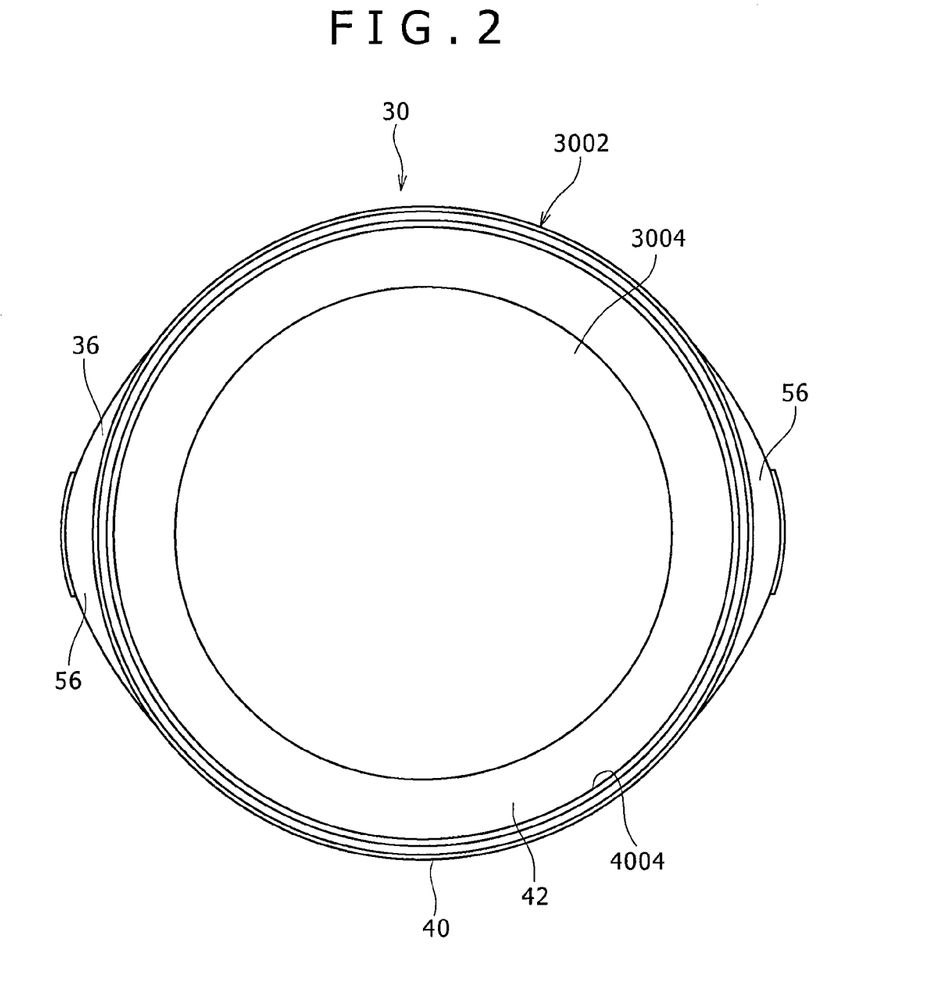
FIG. 2 is a plan view of the wide-angle converter lens 30.
Figure 3:
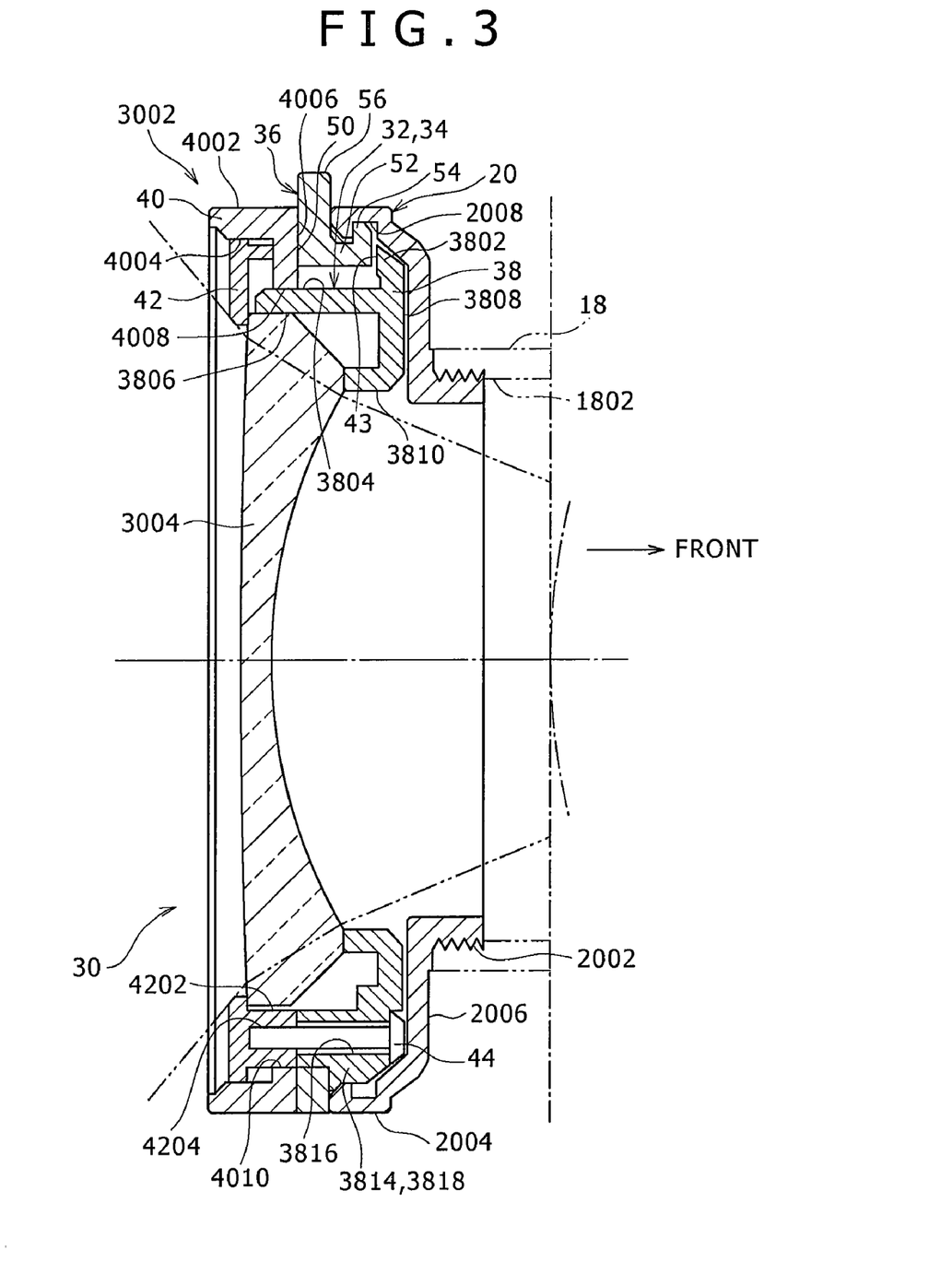
FIG. 3 is a sectional view of the wide-angle converter lens 30.

FIG. 1 is a perspective view of a video camera 10, an adapter ring 20 and a wide-angle converter lens 30, FIG. 2 is a plan view of the wide-angle converter lens 30, and FIG. 3 is a sectional view of the wide-angle converter lens 30.

Figure 4:
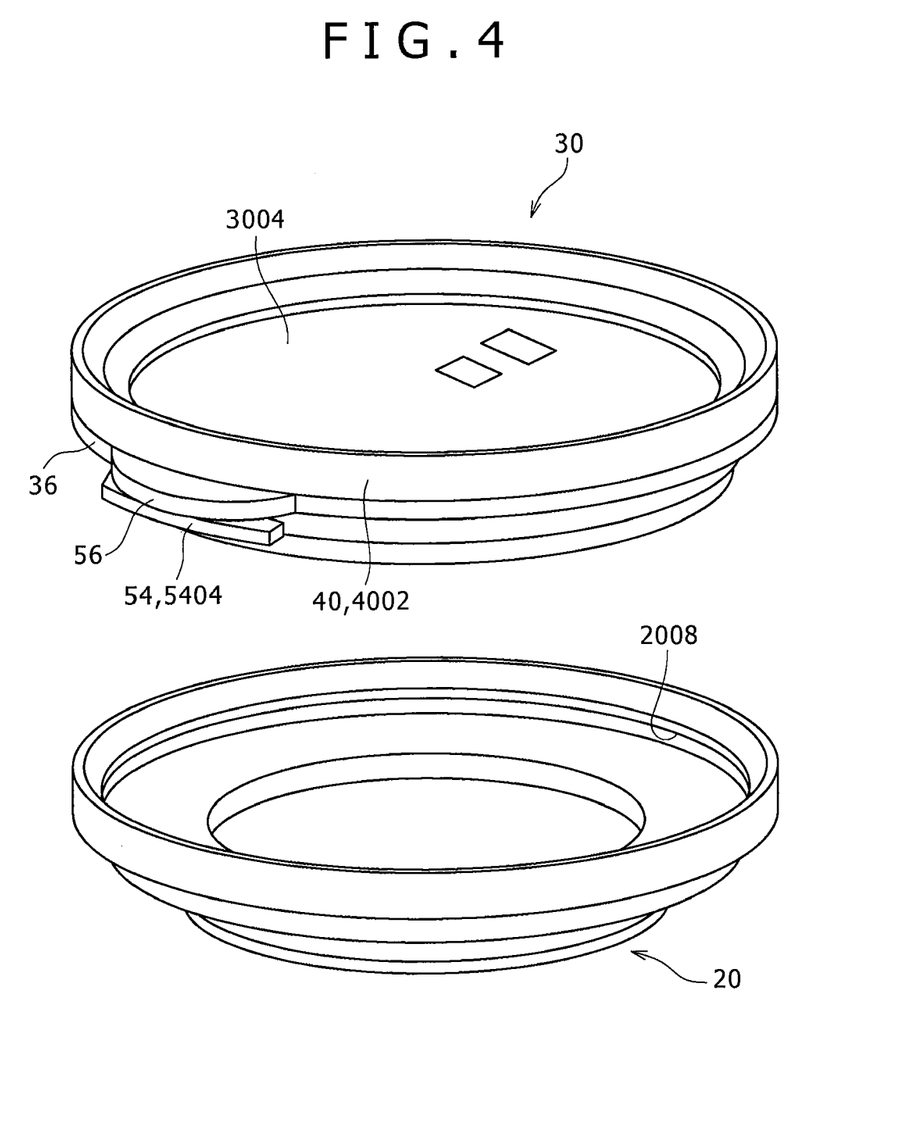
FIG. 4 is a view explaining a relation between the wide-angle converter lens 30 and the adapter ring 20.
Figure 5:
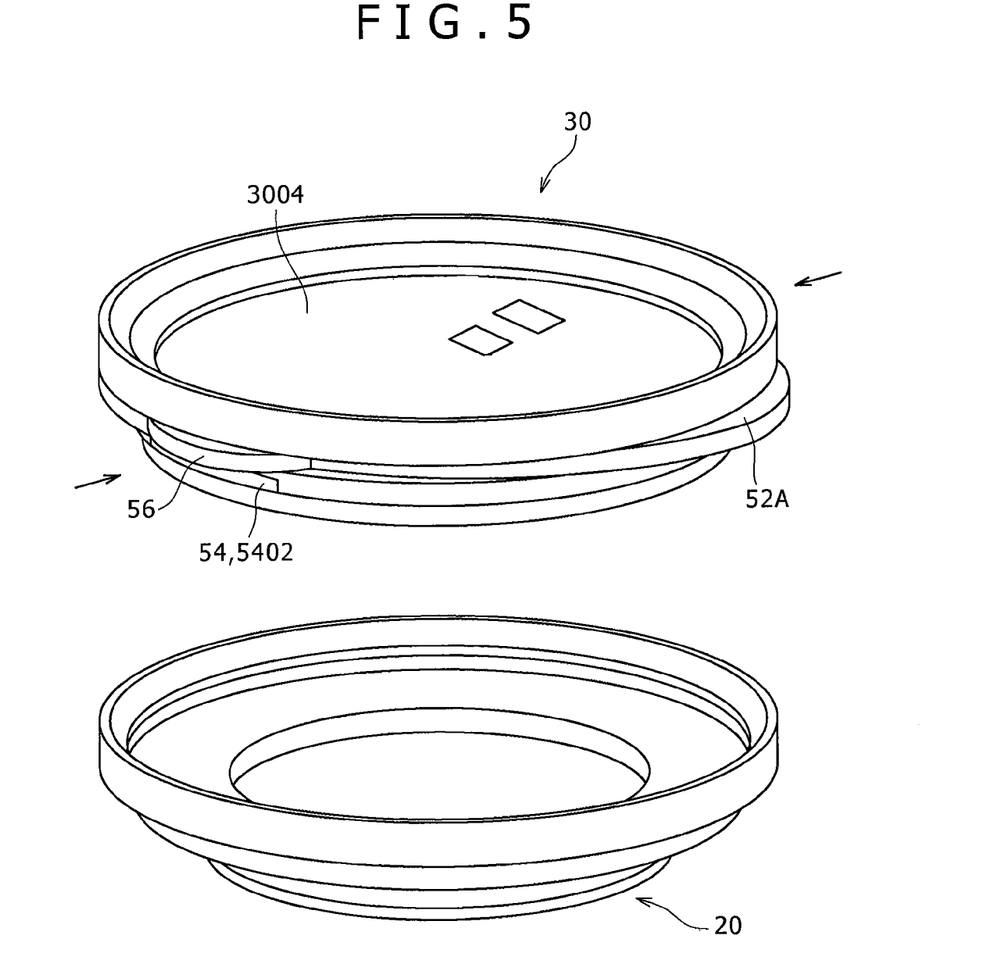
FIG. 5 is a view explaining a relation between the wide-angle converter lens 30 and the adapter ring 20 in a state where operating projections 56 are depressed.

FIG. 4 is a view explaining the relation between the wide-angle converter lens 30 and the adapter ring 20, and FIG. 5 is a view explaining the relation between the wide-angle converter lens 30 and the adapter ring 20 in a state where operating projections 56 have been depressed.

FIG. 6(A) is a perspective view of a retaining ring 36 and FIG. 6(B) is a perspective view of the retaining ring 36 in a state where the operating projections 56 are depressed.

Figure 7:
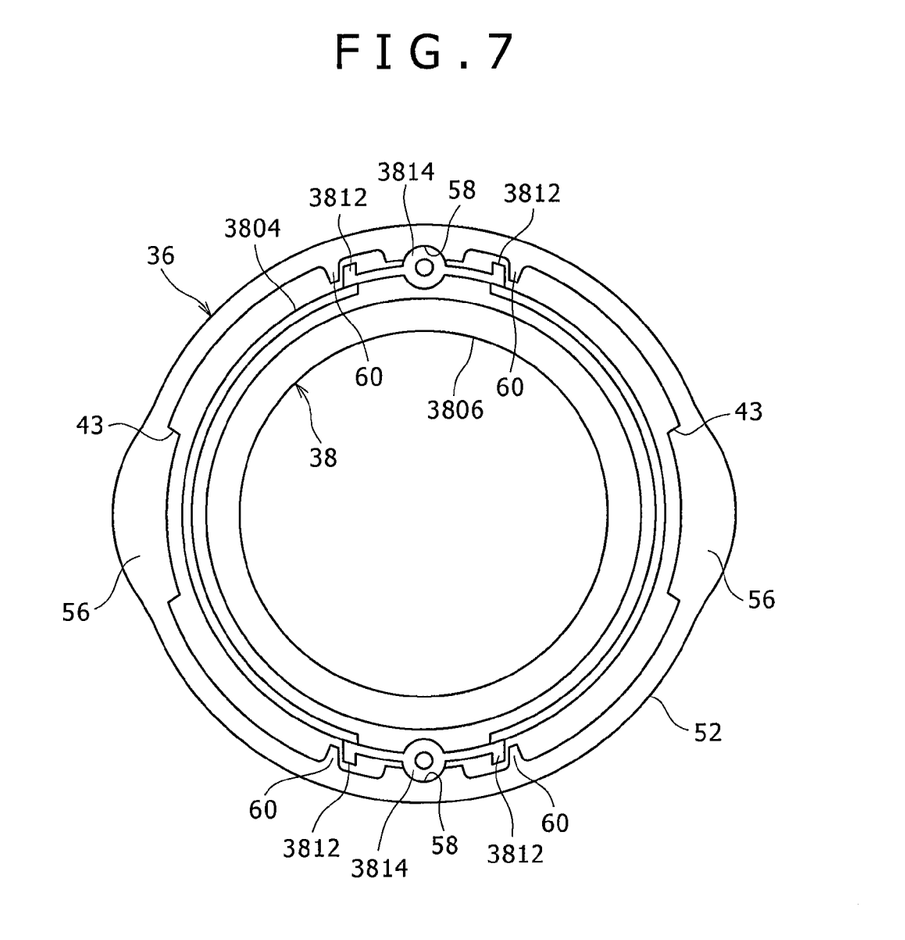
FIG. 7 is a view explaining a relation between the retaining ring 36 and a rear housing 38.
Figure 8:
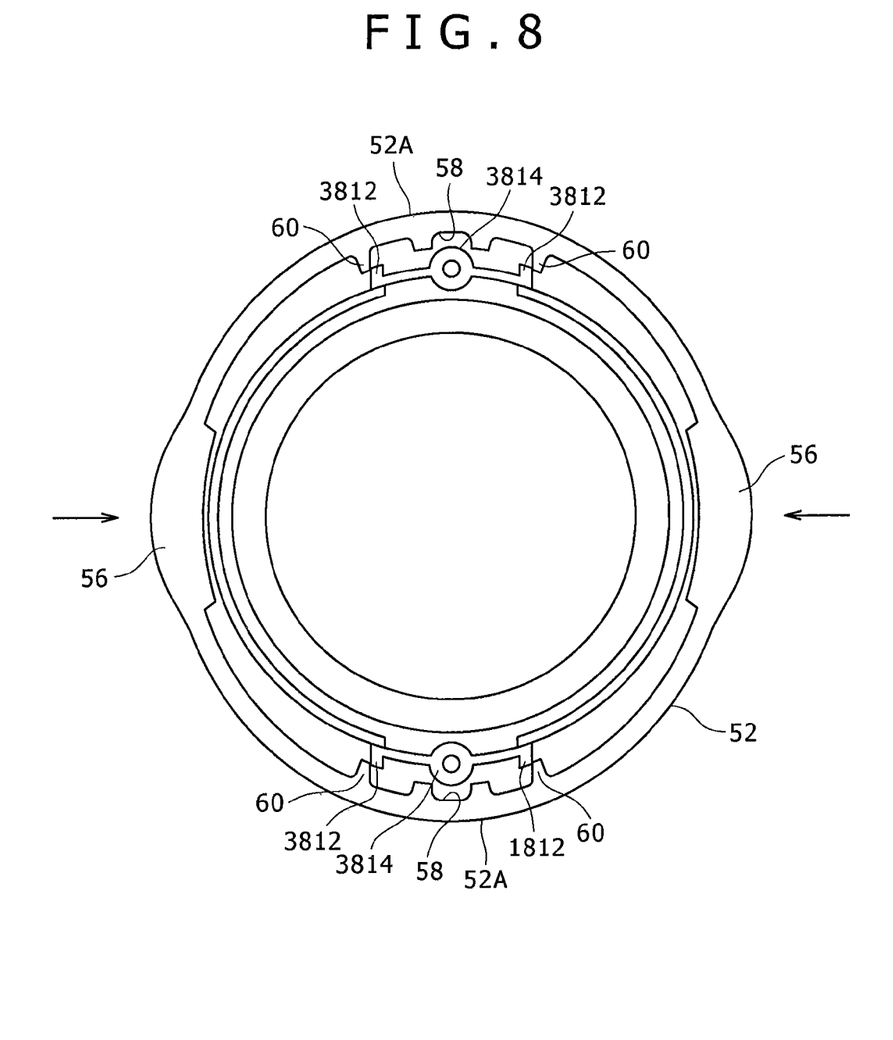
FIG. 8 is a view explaining a relation between the retaining ring 36 and the rear housing 38 in a state where the operating projections 56 are depressed.

FIG. 7 is a view explaining the relation between the retaining ring 36 and a rear housing 38. FIG. 8 is a view explaining a relation between the retaining ring 36 and the rear housing 38 in a state where the operating projections 56 are depressed.

In the embodiment, a wide-angle converter lens mounted to a video camera will be exemplarily explained as an accessory.

As shown in FIG. 1, the video camera 10 to which the wide-angle converter lens 30 is mounted has a case 12 forming an outer package, a foldable display panel 14, for displaying images picked up by the video camera 10, attached to the right side of the case 12, and a recording and reproducing unit 16, for recording image data on a disk recording medium and reproducing the recorded image data, attached to the left side of the case 12.

A lens barrel 18 is placed on a front part of the case 12. An image of an object is transmitted through the lens barrel 18 to an image-sensing device held in the case 12.

The adapter ring 20 is attached to the front end of the lens barrel 18.

As shown in FIG. 3, the adapter ring 20 has a hollow shape. The adapter ring 20 has an externally threaded part 2002, a cylindrical part 2004 coaxial with the externally threaded part 2002 and having a diameter greater than that of the externally threaded part 2002, and an annular flat part 2006 connecting the externally threaded part 2002 and the cylindrical part 2004.

An engaging annular groove 2008 is formed in the inner circumference of the cylindrical part 2004.

The adapter ring 20 is mounted on the lens barrel 18 by screwing the externally threaded part 2002 in an internally threaded front end part 1802 of the lens barrel 18.

As shown in FIGS. 2 and 3, the wide-angle converter lens 30 includes a housing 3002, a lens 3004 held in the housing 3002, and a retaining ring 36 mounted on the outer circumference 34 of a cylindrical part 32 of the housing 3002. The cylindrical part 32 is a part connected to the adapter ring 20.

As shown in FIG. 3, the housing 3002 is formed by superposing and combining an annular rear housing 38, an annular front housing 40, and an ornamental ring 42.

The rear housing 38 has, in a coaxial arrangement, a first outer circumference 3802, a second outer circumference 3804 of a diameter smaller than that of the first outer circumference 3802, a first inner circumference 3806 positioned on the inner side of the second outer circumference 3804, and a rear end surface 3808.

The second outer circumference 3804 is on the front side of the front end of the first outer circumference 3802 with respect to an axial direction.

The terms, "on the front side", "forward" and such signifies on the side of an object, toward the object and such.

The rear end surface 3808 interconnects the rear end of the first outer circumference 3802 and the rear end of the first inner circumference 3806, and is provided with a rear end opening 3810 having an inside diameter smaller than that of the first inner circumference 3806 in its central part.

The cylindrical part 32 has the first outer circumference 3802, the second outer circumference 3804, the first inner circumference 3806 and the rear end surface 3808.

As shown in FIGS. 3 and 7, two recesses 43 are formed in the first outer circumference 3802 at circumferential intervals. The recesses 43 extend between the front edge of the outer circumference 3802 and the rear end surface 3808.

As shown in FIG. 3, the bottoms of the recesses 43 are parts of the second outer circumference 3804.

As shown in FIG. 7, first projections 3812 and protrusions 3814 are formed on the second outer circumference 3804.

The first projections 3812 are formed in two opposite parts of the second outer circumference 3804. That is, the first projections 3812 are formed on the second outer circumference 3804 in parts at angular intervals of 180°. The two first projections 3812 are formed in each of the two parts at an angular interval. Thus the number of the first projections 3812 is four.

The first projections 3812 extend parallel to a diameter of the second outer circumference 3084 between the second outer circumference 3804 and the first outer circumference 3802.

The first projections 3812 form a restraining mechanism for restraining the retaining ring 36 from turning, as described below.

As shown in FIG. 7, the protrusions 3814 lie between the first outer circumference 3802 (FIG. 3) and the second outer circumference 3804 with respect to radial directions.

The protrusions 3814 are formed in diametrically opposite parts of the second outer circumference 3804. That is, the protrusions 3814 are formed in parts of the second circumference 3804 at angular intervals of 180° in the circumferential direction.

In this embodiment, each of the protrusions 3814 is between the two first projections 3812.

Contact projections 58 of the retaining ring 36 (explained below) come into contact with the protrusions 3814.

In this embodiment, the rear housing 38 and the front housing 40 are fastened together with screws 44 as shown in FIG. 3. The protrusions 3814 are bosses 3818 provided with through holes 3816 through which the screws 44 are passed. The through holes 3816 through which the screws 44 are passed open in the rear end surface 3808.

As shown in FIG. 3, the front housing 40 has a third outer circumference 4002, a second inner circumference 4004 on the inner side of the third outer circumference 4002, and a rear end surface 4006. The third outer circumference 4002 and the second inner circumference 4004 extend coaxially.

The rear end surface 4006 interconnects the rear end of the third outer circumference 4002 and the rear end of the second inner circumference 4004, and is provided, in its central part, with a front end opening 4008 having an inside diameter smaller than that of the second inner circumference 4004 and greater than the diameter of the second outer circumference 3804.

Cuts 4010 through which the screws 44 are passed are formed in the two parts at an angular interval in the circumferential direction of the rear end surface 4006 so as to correspond to the protrusions 3814, respectively.

As shown in FIG. 2, the ornamental ring 42 is an annular plate, formed in an outside diameter so as to be fitted in the second inner circumference 4004, and has an inside diameter smaller than the diameter of the front end opening 4008 (FIG. 3).

As shown in FIG. 3, two bosses 4202 are formed at two circumferentially separated positions of the ornamental ring 42 corresponding to the cuts 4010. Each of the bosses 4202 is provided with a threaded hole 4204 into which the screw 44 is screwed.

The wide-angle converter lens 30 is assembled by the following method.

As shown in FIG. 3, the retaining ring 36 is engaged with the second outer circumference 3804 of the rear housing 38, and the lens 3004 is fitted in the first inner circumference 3806.

The ornamental ring 42 is fitted in the second inner circumference 4004 of the front housing 40, and the bosses 4202 of the ornamental ring 42 are inserted in the cuts 4010 formed in the rear end surface 4006.

The second outer circumference 3804 is fitted in the front end opening 4008 of the front housing 40. The rear end surface 4006 of the front housing 40 is joined to the ends of the projections 3812 and the protrusions 3814.

The screws 44 are inserted into the through holes 3816 and are screwed into the threaded holes 4204 of the bosses 4202 of the ornamental ring 42 to fasten together the rear housing 38 and the front housing 40.

The lens 3004 fitted in the first inner circumference 3806 is fixedly held between a wall defining the rear end opening 3810, and the ornamental ring 42.

When the rear housing 38 and the front housing 40 are thus assembled, the rear end surface 4006 of the front housing 40 is at the front end of the second outer circumference 3804, and an annular groove 50 having a bottom surface defined by the second outer circumference 3804 is formed between the first outer circumference 3802 and the third outer circumference 4002.

The retaining ring 36 is fitted in the annular groove 50.

As shown in FIGS. 3 and 6(A), the retaining ring 36 has an elastically deformable annular part 52 mounted on the outer circumference 34 of the cylindrical part 32, and retaining ridges 54 protruding from the annular part 52 radially outward with respect to the outer circumference 34.

In this embodiment, the retaining ring 36 is a unitary member formed by molding a synthetic resin.

When parts of the annular part 52 provided with the retaining ridges 54 are depressed radially inward of the annular part 52, the retaining ridges 54 sink radially inward of the annular part 52 together with the parts of the annular part 52.

The retaining ridges 54 are formed at two diametrically opposite positions on the annular part 52, respectively.

The parts of the annular part 52 provided with the retaining ridges 54 are provided with operating protrusions 56 protruding radially outward relative to the annular part 52, respectively.

The annular part 52 has an inside diameter greater than the outside diameter of the second outer circumference 3804, namely, the bottom surface of the annular groove 50. The annular part 52 is fitted in the annular groove 50.

As shown in FIGS. 6(A) and 7, the contact projections 58 are formed at positions on the annular part 52 other than those where the retaining ridges 54 are formed in the circumferential direction of the annular part 52. The contact projections 58 come into contact with the bottom surface (the second outer circumference 3804) of the annular groove 50 or the part of the annular part 50 to position the annular part 52 coaxially with the bottom surface of the annular groove 50.

In this embodiment, the contact projections 58 are formed in parts 52A of the annular part 52 at 90° from the parts in which the retaining ridges 54 are formed.

In this embodiment, the contact projections 58 are formed so as to be in contact with the protrusions 3814 of the rear housing 38.

The contact projections 58 in contact with the protrusions 3814 hold the retaining ring 36 coaxially with the annular groove 50 (FIG. 3) and restrains the retaining ring 36 from rattling in radial directions in the annular groove 50.

As shown in FIGS. 6(A) and 7, two second projections 60 capable of coming into contact with respect to a circumferential direction with the side surfaces of the first projections 3812 are formed on the inner circumference of the annular part 52 so as to protrude radially inward from the annular part 52 at positions separated from the retaining ridges 54.

In this embodiment, first projections 3812, namely, four first projections 3812 are formed at diametrically opposite positions of the second outer circumference 3804, respectively. The pairs of second projections 60 are formed at diametrically opposite positions, respectively, such that the two projections 3812 lie between each pair of second projections 60 at diametrically opposite parts of the second outer circumference 3804.

The first projections 3812 and the second projections 60 form a restraining mechanism for restraining the retaining ring 36 from turning in the annular groove 50.

Thus the circumferential rattling of the retaining ring 36 in the annular groove 50 (FIG. 3) is prevented by the restraining mechanism.

In this embodiment, each of the contact projections 58 is provided at the middle between the two second projections 60 in the circumferential direction of the annular part 52.

As shown in FIG. 6(A), the annular part 52 has a thickness along a radial direction of the annular part 52, and a width along the axis thereof.

Each of the retaining ridges 54 has a bottom wall 5402 extending from the inner circumference of the annular part 52 in the direction of the width of the annular part 52 in the recess 43 (FIG. 3), and a protruded wall 5404 extending radially outward of the annular part 52 from the end of the bottom wall 5402, spaced from the annular part 52, and protruding radially outward with respect to the first outer circumference 3802 (FIG. 3).

Figure 6:
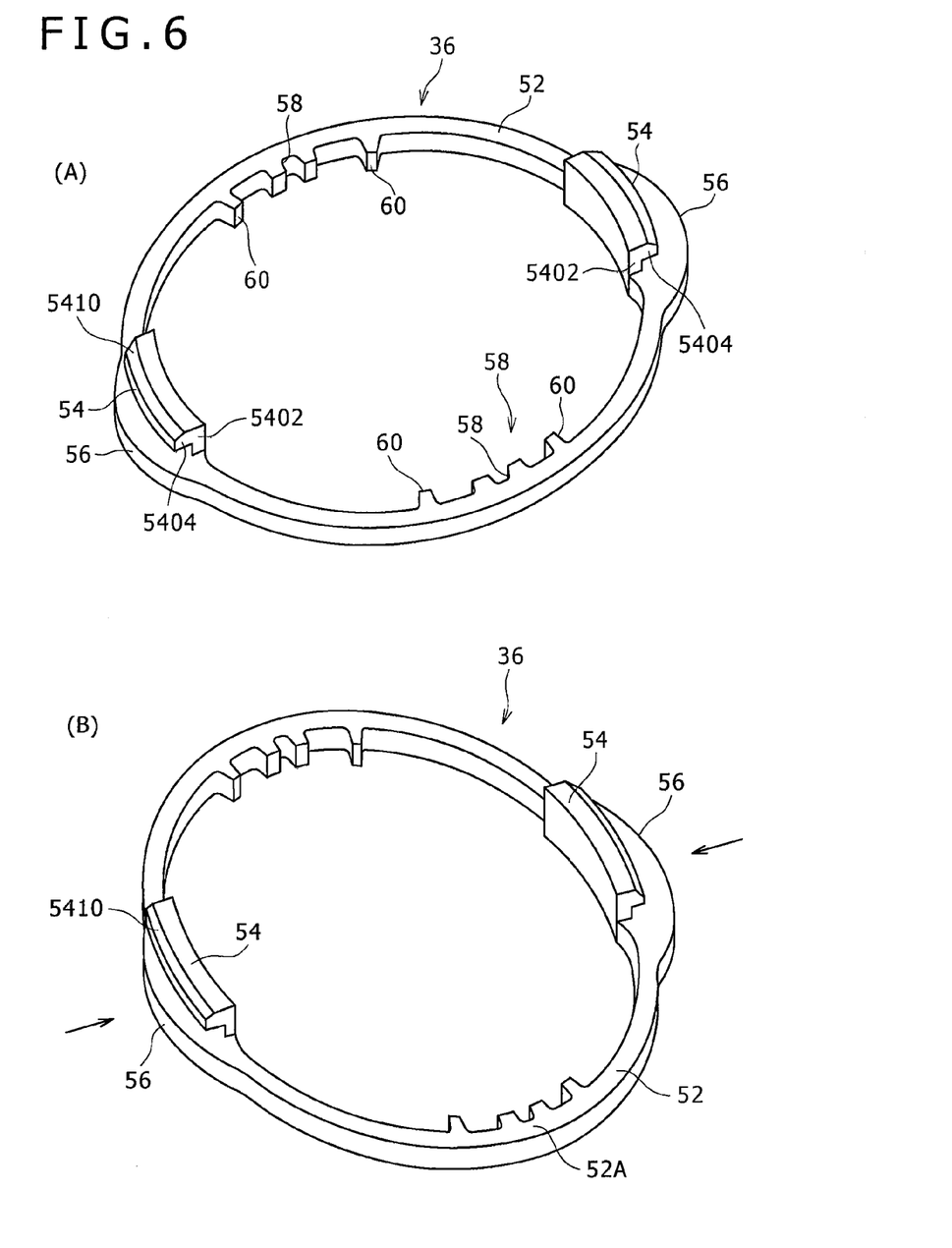

Each protruded wall 5404 is displaced to a position on the radially inner side of the first outer circumference 3802 when a part, provided with the stopping ridge 54, of the annular part 52 is depressed radially inward of the annular part 52. This state is shown in FIGS. 5, 6 and 8. That is, when the two operating projections 56 are depressed, the protruded walls 5404 sink radially from the first outer circumference 3802, the parts provided with the retaining ridges 54, of the annular part 52 are moved radially inward of the annular part 52, and the parts 52A of the annular part 52 at 90° from the operating projections 56 are moved radially outward of the annular part 52.

When the two operating projections 56 are released free, the annular part 52 returns to its original position (see FIGS. 4, 7) by its own elasticity, the protruded walls 5404 extend radially outward beyond the first outer circumference 3802.

The retaining ridges 54 engage in the annular groove 2008 when the cylindrical part 32 is engaged with the inner circumference of the cylindrical part 2004 of the adapter ring 20 to prevent falling off of the wide-angle converter lens 30 from the adapter ring 20.

In this embodiment, each of the retaining ridges 54 has a bevel edge 5410 (see FIG. 6). More specifically, each of the protruded walls 5404 has a bevel edge 5410.

The operating projections 56 protrude radially outward from the third outer circumference 4002 of the front housing 40 as shown in FIGS. 3 and 4 when the wide-angle converter lens 30 is assembled.

In this embodiment, the retaining ridges 54 protrude from the recesses 43 to the exterior of the first outer circumference 3802 while the operating projections 56 are not depressed.

When the wide-angle converter lens 30 held with its rear end surface 3808 facing the inside of the adapter ring 20 is pushed into the adapter ring 20, the bevel edges 5410 (FIG. 6) of the retaining ridges 54 come into contact with the inner circumference of the cylindrical part 2004 of the adapter ring 20 and, consequently, the retaining ridges 54 are forcibly sink radially inward of the first outer circumference 3802.

When the first outer circumference 3802 of the wide-angle converter lens 30 is fitted in the cylindrical part 2004 of the adapter ring 20, and the retaining ridges 54 are on the engaging annular groove 2008, the retaining ridges 54 expand radially outward of the first outer circumference 3802 by elasticity of the annular part 52, and engage with the annular groove 2008.

Even when the two operating projections 56 are depressed to make the retaining projections 54 sink radially inward of the first outer circumference 3802, and the operating projections 56 are released free after the first outer circumference 3802 of the wide-angle converter lens 30 has been inserted into the cylindrical part 2004 of the adapter ring 20, the retaining ridges 54 expand radially outward of the first outer circumference 3802 by the elasticity of the annular part 52, and engage with the annular groove 2008.

The pair of operating projections 56 is depressed by fingers to remove the wide-angle converter lens 30.

Then, the retaining ring 36 is deformed as shown in FIGS. 6(B) and 8, and the protruded walls 5404 sink radially inward from the first outer circumference 3802 (FIG. 3).

The user can remove the wide-angle converter lens 30 from the adapter ring 20 in a state where the pair of operating projections 56 are depressed by fingers, and the wide-angle converter lens 30 can be removed.

When the pair of operating projections 56 are depressed by fingers, the parts 52A provided with the second projections 60 and the contact projections 58 move away from the second outer circumference 3804 as shown in FIG. 8. However, since the first projections 3812 and the second projections 60 remain engaged, the contact projections 58 come into contact with the protrusions 3814 and the retaining ring 36 returns to its original position when the pair of operating projections 56 is released free.

In this embodiment, the retaining ridges 54 are formed integrally with the retaining ring 36, and the retaining ridges 54 can be easily moved radially by a single action for pinching the retaining ring 36.

Thus the single retaining ring 36 can serve as a mechanism for attaching the wide-angle converter lens 30 to and detaching the wide-angle converter lens 30 from the adapter ring 20, which is effective in reducing the number of component parts and reducing the cost.

Since the retaining ring 36 can be manufactured by molding the synthetic resin in a mass-production mode, which is effective in further reducing the cost.

Extension of the optical path of the optical system through the retaining ring 36 is suitable particularly for an accessory including optical parts.

Although the restraining mechanism including the first projections 3812 and the second projections 60 may be omitted, in the case where the restraining mechanism of this embodiment is provided, the restraining mechanism restrains the retaining ring 36 from circumferential movement in the annular groove 50, which improves facility.

Although the protrusions 3814 and the contact projections 58 that contact each other may be omitted, in the case where the protrusions 3814 and the contact projections 58 are provided, the protrusions 3814 and the contact projections 58 restrain the retaining ring 36 from radial movement in the annular groove 50, which improve facility.

Figure 9:
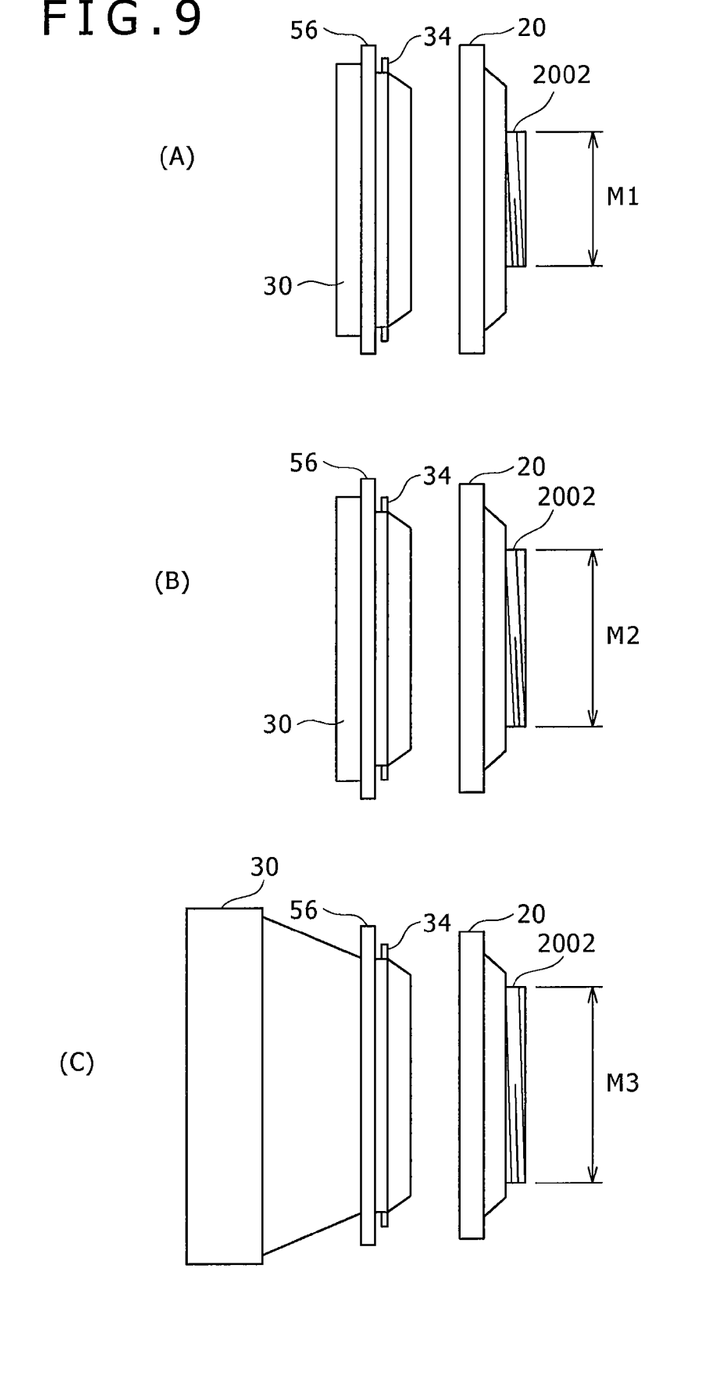
FIGS. 9(A), 9(B) and 9(C) are views explaining a relation between an optical filter and the adapter ring, a relation between a wide-angle converter lens and the adapter ring, and a relation between a teleconverter lens and the adapter ring, respectively.

FIGS. 9(A), 9(B) and 9(C) are views explaining the relation between an optical filter and the adapter ring, the relation between a wide-angle converter lens and the adapter ring, and the relation between a teleconverter lens and the adapter, respectively.

As shown in FIGS. 9(A), 9(B) and 9(C), the accessory according to the present invention is not limited to the wide-angle converter lens, and the present invention is applicable to various accessories respectively provided with known optical parts including an optical filter 30 shown in FIG. 9(A) and a teleconverter lens 30 shown in FIG. 9(C).

In this case, as shown in FIGS. 9(A), 9(B) and 9(C), the externally threaded parts 2002 of the adapter rings 20 may be formed in one of diameters M1, M2 and M3 to put the adapter rings 20 to one of image pickup apparatuses having internally threaded parts different diameters.

Accessories of the present invention are not limited to those provided with an optical part and the present invention is applicable to caps including lens caps or lens hoods.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. An accessory comprising:
a cylindrical member to be connected to a device, and
a retaining ring mounted on the outer circumference of the cylindrical member the retaining ring including an elastically deformable annular part mounted on the outer circumference, and retaining ridges disposed on parts of the annular part, respectively, so as to protrude radially outward from the outer circumference;
wherein the retaining ridges move radially inward of the annular part together with the parts of the annular part when the parts, where the retaining ridges are disposed, of the annular part are depressed radially inward of the annular part, wherein an annular groove is formed in the outer circumference of the cylindrical member,
the annular part has an inside diameter greater than the outside diameter of a bottom surface of the annular groove, and is engaged in the annular groove, and
the retaining ridges sink radially inward from the outer circumference when the parts, where the retaining ridges are disposed, of the annular part are depressed radially inward of the annular part.

2. An accessory comprising:
a cylindrical member to be connected to a device, and
a retaining ring mounted on the outer circumference of the cylindrical member the retaining ring including an elastically deformable annular part mounted on the outer circumference, and retaining ridges disposed on parts of the annular part, respectively, so as to protrude radially outward from the outer circumference;
wherein the retaining ridges move radially inward of the annular part together with the parts of the annular part when the parts, where the retaining ridges are disposed, of the annular part are depressed radially inward of the annular part, wherein an annular groove is formed in the outer circumference of the cylindrical member,
the annular part has an inside diameter greater than the outside diameter of a bottom surface of the annular groove, and is engaged in the annular groove, and
spacing projections are formed on the annular part at positions circumferentially spaced apart from those where the retaining ridges are formed so as to be in contact with the bottom surface or parts of the annular groove to hold the annular part coaxially with the bottom surface.

3. An accessory comprising:
a cylindrical member to be connected to a device, and
a retaining ring mounted on the outer circumference of the cylindrical member the retaining ring including an elastically deformable annular part mounted on the outer circumference, and retaining ridges disposed on parts of the annular part, respectively, so as to protrude radially outward from the outer circumference;
wherein the retaining ridges move radially inward of the annular part together with the parts of the annular part when the parts, where the retaining ridges are disposed, of the annular part are depressed radially inward of the annular part, wherein the number of the retaining ridges is two, and the two retaining ridges are disposed at angular intervals of 180° in the circumferential direction of the annular part,
the cylindrical member is provided with an annular groove in its outer circumference,
the annular part has an inside diameter greater than the outside diameter of a bottom surface of the annular groove, and is engaged in the annular groove, and
spacing projections are formed on the annular part at positions at an angular distance of 90° from those where the retaining ridges are formed, respectively, so as to be in contact with the bottom surface or parts of the annular groove to hold the annular part coaxially with the bottom surface.

4. An accessory comprising:
a cylindrical member to be connected to a device, and
a retaining ring mounted on the outer circumference of the cylindrical member the retaining ring including an elastically deformable annular part mounted on the outer circumference, and retaining ridges disposed on parts of the annular part, respectively, so as to protrude radially outward from the outer circumference;
wherein the retaining ridges move radially inward of the annular part together with the parts of the annular part when the parts, where the retaining ridges are disposed, of the annular part are depressed radially inward of the annular part, wherein the cylindrical member is provided with an annular groove in its outer circumference,
recesses are formed in the outer circumference so as to communicate with the annular groove and so as to extend in the direction of the width of the annular groove,
the annular part has an inside diameter greater than the outside diameter of the bottom surface of the annular groove and is engaged in the annular groove,
the annular part has a thickness along the diameter thereof, and a width along the axis thereof,
each of the retaining ridges has a bottom wall extending from the inner circumference of the annular part in the direction of the width of the annular part in the recess, and a protruded wall extending radially outward of the annular part from the end of the bottom wall, spaced from the annular part, and protruding radially outward from the outer circumference.

5. The accessory according to claim 4, wherein the protruded walls sink radially inward from the outer circumference when the parts, provided with the retaining ridges, of the annular part are depressed radially inward of the annular part.

6. An accessory comprising:
a cylindrical member to be connected to a device, and
a retaining ring mounted on the outer circumference of the cylindrical member the retaining ring including an elastically deformable annular part mounted on the outer circumference, and retaining ridges disposed on parts of the annular part, respectively, so as to protrude radially outward from the outer circumference;
wherein the retaining ridges move radially inward of the annular part together with the parts of the annular part when the parts, where the retaining ridges are disposed, of the annular part are depressed radially inward of the annular part, wherein restraining mechanisms for restraining the retaining ring from turning on the outer circumference are formed between the cylindrical member and the annular part.

7. The accessory according to claim 6, wherein the number of the retaining ridges is two,
the two retaining ridges are disposed at angular intervals of 180° in the circumferential direction of the annular part and
the restraining mechanisms are spaced apart from the positions of the retaining ridges by an angular distance of 90°.

8. An accessory comprising:
a cylindrical member to be connected to a device, and
a retaining ring mounted on the outer circumference of the cylindrical member the retaining ring including an elastically deformable annular part mounted on the outer circumference, and retaining ridges disposed on parts of the annular part, respectively, so as to protrude radially outward from the outer circumference;
wherein the retaining ridges move radially inward of the annular part together with the parts of the annular part when the parts, where the retaining ridges are disposed, of the annular part are depressed radially inward of the annular part, wherein an annular groove is formed in the outer circumference of the cylindrical member,
the annular part has an inside diameter greater than the outside diameter of the bottom surface of the annular groove, and is engaged in the annular groove,
restraining mechanisms for restraining the turning of the retaining ring in the annular groove are formed,
a first projection protruding radially outward is formed on the bottom surface of the annular groove,
two second projections protrude radially inward from parts of the inner circumference of the annular part circumferentially spaced from the retaining ridges so as to be in contact, in the circumferential direction, with both the sides of the first projection, and
the restraining mechanism includes the first projection and the two second projections.

9. An accessory comprising:
a cylindrical member to be connected to a device, and
a retaining ring mounted on the outer circumference of the cylindrical member the retaining ring including an elastically deformable annular part mounted on the outer circumference, and retaining ridges disposed on parts of the annular part, respectively, so as to protrude radially outward from the outer circumference;
wherein the retaining ridges move radially inward of the annular part together with the parts of the annular part when the parts, where the retaining ridges are disposed, of the annular part are depressed radially inward of the annular part, wherein an annular groove is formed in the outer circumference of the cylindrical member,
the annular part has an inside diameter greater than the outside diameter of the bottom surface of the annular groove, and is engaged in the annular groove,
restraining mechanisms for restraining the turning of the retaining ring in the annular groove are formed,
two circumferentially spaced apart first projections are provided that protrude radially outward from the bottom surface of the annular groove,
two second projections that protrude radially inward and are in contact with parts mutually circumferentially spaced apart from the two first projections are provided at circumferentially spaced apart positions from the retaining ridges on the inner circumference of the annular part and
the restraining mechanism includes the two first projections and the two second projections.

10. An accessory comprising:
a cylindrical member to be connected to a device, and
a retaining ring mounted on the outer circumference of the cylindrical member the retaining ring including an elastically deformable annular part mounted on the outer circumference, and retaining ridges disposed on parts of the annular part, respectively, so as to protrude radially outward from the outer circumference;
wherein the retaining ridges move radially inward of the annular part together with the parts of the annular part when the parts, where the retaining ridges are disposed, of the annular part are depressed radially inward of the annular part, wherein the accessory further comprises a housing formed by superposing and combining an annular front housing on/with an annular rear housing;

the cylindrical member is included in the front housing;

an annular groove is formed in a portion of the outer circumference of the cylindrical member at the joint of the front and the rear housings;

the annular part has an inside diameter greater than the outside diameter of a bottom surface of the annular groove, and is engaged in the annular groove; and the retaining ridges move radially inward of the outer circumference when the parts, where the retaining ridges are disposed, of the annular part are depressed radially inward of the annular part.

11. An accessory comprising:

a cylindrical member to be connected to a device, and a retaining ring mounted on the outer circumference of the cylindrical member the retaining ring including an elastically deformable annular part mounted on the outer circumference, and retaining ridges disposed on parts of the annular part, respectively, so as to protrude radially outward from the outer circumference;

wherein the retaining ridges move radially inward of the annular part together with the parts of the annular part when the parts, where the retaining ridges are disposed, of the annular part are depressed radially inward of the annular part, wherein the accessory comprises a housing formed by superposing and combining an annular front housing on/with an annular rear housing;

the cylindrical member is included in the front housing;

an annular groove is formed in a portion of the outer circumference of the cylindrical member at the joint of the front and the rear housings;

the annular part has an inside diameter greater than the outside diameter of a bottom surface of the annular groove, and is engaged in the annular groove;

the front and the rear housings are fastened together with longitudinally extended screws;

the front housing is provided with bosses respectively extending longitudinally in the annular groove, formed with through holes for the screws, and formed at circumferentially spaced apart positions in the annular groove; and spacing projections are respectively formed on the annular part so as to protrude radially inward at positions diametrically opposite to each other and circumferentially spaced apart from those where the retaining ridges are formed so as to be in contact with the bosses to hold the annular part coaxially with the bottom surface.

12. The accessory according to claim 11, wherein an optical part is held in the cylindrical member.

13. The accessory according to claim 11, wherein the retaining ring is a unitary member formed by molding a synthetic resin in a mold.

* * * * *